(12) United States Patent
Liu et al.

(10) Patent No.: US 9,879,711 B2
(45) Date of Patent: Jan. 30, 2018

(54) WHEEL BOLT CAP

(71) Applicant: HONDA MOTOR CO., LTD., Minato-ku, Tokyo (JP)

(72) Inventors: David S. Liu, Powell, OH (US); Yilin Liu, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/184,307

(22) Filed: Jun. 16, 2016

(65) Prior Publication Data

US 2017/0363136 A1   Dec. 21, 2017

(51) Int. Cl.
*F16B 37/14* (2006.01)
*B60B 7/00* (2006.01)

(52) U.S. Cl.
CPC ............... *F16B 37/14* (2013.01); *B60B 7/00* (2013.01); *B60B 2900/211* (2013.01); *B60B 2900/572* (2013.01)

(58) Field of Classification Search
CPC ...................................................... F16B 37/14
USPC ............................. 411/372.5, 372.6, 373, 431
See application file for complete search history.

(56) References Cited

U.S. PATENT DOCUMENTS

| | | | |
|---|---|---|---|
| 2,627,778 A * | 2/1953 | Hodell | A47G 3/00 261/DIG. 38 |
| 2,816,473 A * | 12/1957 | Labbee | A47G 3/00 411/406 |
| 3,529,508 A * | 9/1970 | Cooksey | A47G 3/00 411/374 |
| 4,143,578 A | 3/1979 | Becker | |
| 4,582,462 A | 4/1986 | Thiel | |
| 4,786,224 A | 11/1988 | Wharton | |
| 4,968,202 A | 11/1990 | Lanham | |
| 5,017,068 A * | 5/1991 | Cooksey | F16B 23/0061 403/282 |
| 5,082,409 A * | 1/1992 | Bias | F16B 37/14 411/372.5 |
| 5,098,239 A * | 3/1992 | Thiel | F16B 37/14 411/377 |
| 5,163,797 A | 11/1992 | Patti | |
| 5,193,884 A | 3/1993 | Sheu et al. | |
| 5,340,201 A | 8/1994 | Weirs | |
| 5,380,070 A | 1/1995 | Fitzgerald | |
| 5,520,445 A | 5/1996 | Toth | |
| 5,590,992 A * | 1/1997 | Russell | B60B 7/14 301/37.374 |
| 5,603,472 A | 2/1997 | Hutter, III | |

(Continued)

FOREIGN PATENT DOCUMENTS

CN      202531613       11/2012
EP      2 642 135   *   9/2013

(Continued)

*Primary Examiner* — Flemming Saether
(74) *Attorney, Agent, or Firm* — Arent Fox LLP

(57) ABSTRACT

A decorative cap and fastener for fastening a wheel to a hub of a vehicle are provided. The fastener includes a fastener head including an outer surface and an internal surface defining a cavity. The cap includes an end wall having an external surface and an internal surface. The cap further includes a side wall extending from an outer periphery of the end wall. The cap also includes a central member extending longitudinally from the internal surface of the end wall within the side wall.

12 Claims, 4 Drawing Sheets

(56) References Cited

U.S. PATENT DOCUMENTS

| | | | |
|---|---|---|---|
| 5,624,218 A * | 4/1997 | Dauwalter | F16B 39/101 |
| | | | 411/373 |
| 5,707,113 A | 1/1998 | Russell | |
| 5,752,795 A | 5/1998 | D'Adamo | |
| 5,772,377 A | 6/1998 | Bydalek | |
| 5,791,848 A | 8/1998 | Lanham | |
| 5,810,532 A | 9/1998 | Huang | |
| 5,827,029 A | 10/1998 | Denman | |
| 5,842,749 A | 12/1998 | DiMarco | |
| 5,857,818 A | 1/1999 | Bias, Sr. | |
| 5,997,229 A * | 12/1999 | Akers | A47G 3/00 |
| | | | 411/372.5 |
| 6,053,683 A | 4/2000 | Cabiran | |
| 6,135,570 A | 10/2000 | Wieczorek | |
| 6,142,579 A | 11/2000 | Thiel | |
| 6,238,158 B1 | 5/2001 | Clements | |
| 6,293,744 B1 | 9/2001 | Hempfling et al. | |
| 6,305,890 B1 | 10/2001 | Okamura | |
| 6,494,658 B1 | 12/2002 | Roy | |
| 6,629,810 B1 | 10/2003 | Heintges et al. | |
| 6,634,842 B2 | 10/2003 | Ueno | |
| 6,827,539 B2 | 12/2004 | Somers et al. | |
| 6,866,457 B2 | 3/2005 | Wilson | |
| 6,916,144 B2 | 7/2005 | Lees | |
| 6,957,939 B2 | 10/2005 | Wilson | |
| 7,004,700 B2 | 2/2006 | Wilson | |
| D519,361 S | 4/2006 | Olander | |
| D547,172 S | 7/2007 | Kent et al. | |
| 7,435,045 B2 | 10/2008 | Wilson | |
| D606,853 S | 12/2009 | Shapiro et al. | |
| 8,016,535 B1 | 9/2011 | Roberts | |
| D649,031 S | 11/2011 | Rand | |
| 8,333,537 B2 | 12/2012 | Rogers et al. | |
| 8,337,129 B2 * | 12/2012 | Boyce | F16B 31/028 |
| | | | 411/102 |
| 8,366,367 B2 | 2/2013 | Matlock et al. | |
| 2002/0192052 A1 | 12/2002 | Ruspa | |
| 2005/0100425 A1 | 5/2005 | Wu | |
| 2008/0080955 A1 | 4/2008 | Liu | |
| 2011/0305539 A1 | 12/2011 | Rand | |
| 2012/0263558 A1 | 10/2012 | Swanson | |
| 2012/0321412 A1 | 12/2012 | Lonn et al. | |
| 2013/0071204 A1 | 3/2013 | Hunter et al. | |
| 2013/0149071 A1 | 6/2013 | Davis et al. | |
| 2013/0336743 A1 | 12/2013 | Hill | |
| 2014/0030042 A1 | 1/2014 | Sugitani | |
| 2014/0161559 A1 | 6/2014 | Kim et al. | |
| 2015/0063940 A1 * | 3/2015 | Marczynski | F16B 1/0071 |
| | | | 411/8 |

FOREIGN PATENT DOCUMENTS

| | | |
|---|---|---|
| GB | 2498769 A | 7/2013 |
| GB | 2502988 A | 12/2013 |
| JP | 2010047061 A | 3/2010 |
| JP | 3106778 U | 3/2011 |
| JP | 2013001164 A | 1/2013 |
| KR | 20090009811 | 9/2009 |
| WO | WO 2013110775 A1 | 8/2013 |
| WO | WO 2014118117 A1 | 8/2014 |
| WO | WO 2014118509 A1 | 8/2014 |
| WO | WO 2014118510 A1 | 8/2014 |

* cited by examiner

WHEEL BOLT CAP

BACKGROUND

The wheel of a passenger vehicle is typically mounted to a hub bearing assembly using either a stud and nut configuration or a wheel bolt configuration. A wheel stud is generally press fit from an internal side of the hub and extends outwardly through the rotor. The wheel is mounted onto a plurality of such wheel studs and wheel nuts are used to hold the wheel onto the stud.

Wheel bolts are generally inserted from the outside through the wheel and into a threaded hole in the hub. Various wheel bolts are known having different features for driving the wheel bolt. For example, some wheel bolts have a hexagonal head that fits a typical wrench or socket. Other wheel bolts have a security design requiring a special adaptor to engage the wheel bolt. The security design helps prevent a thief from being able to easily remove the wheel. Wheel bolts may generally be designed for load bearing rather than ornamental design. Further, wheel bolts may be exposed to weather and road grime, which may cause corrosion. Wheel bolt caps are used to cover the wheel bolt cap for ornamental and protective purposes. Wheel bolt caps, however, may fall off of the wheel bolts.

In view of the foregoing, there is a need for improvements to wheel bolt caps. Further advantages will become apparent from the disclosure provided below.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

According to one aspect of the present disclosure, a decorative cap and fastener for fastening a wheel to a hub of a vehicle are provided. The fastener includes a fastener head including an outer surface and an internal surface defining a cavity. The cap includes an end wall having an external surface and an internal surface. The cap further includes a side wall extending from an outer periphery of the end wall. The cap also includes a central member extending longitudinally from the internal surface of the end wall within the side wall.

In another aspect of the present disclosure, a cap for covering a fastener, includes an end wall having an external surface and an internal surface. The cap also includes a side wall extending from an outer periphery of the end wall. The cap also includes a central member extending longitudinally from the internal surface of the end wall within the side wall.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

A "vehicle," as used herein, refers to any moving vehicle that may be capable of carrying one or more human occupants and is powered by any form of energy. The term "vehicle" includes, but is not limited to: cars, trucks, vans, minivans, SUVs, motorcycles, scooters, boats, personal watercraft, and aircraft. In some cases, a motor vehicle includes one or more engines.

Generally described, the present disclosure provides for a wheel bolt cap with a firm interference fit to the head of a wheel bolt for a vehicle. The wheel bolt cap may include a central interior protrusion that interferes with an internal surface of the wheel bolt cap. The wheel bolt cap may be made from a different material than the wheel bolt and may have a greater coefficient of thermal expansion. When the temperature decreases, the wheel bolt cap may shrink more than the wheel bolt head. Accordingly, the side walls of the wheel bolt cap may squeeze the external surface of the wheel bolt head. When the temperature increases, the wheel bolt cap may expand more than the head of the wheel bolt. Although the interference between the side walls of the wheel bolt and the external surface of the wheel bolt head may decrease, the interference between the central interior protrusion and the internal surface of the wheel bolt head may increase. Accordingly, the wheel bolt cap may maintain a desired interference fit with the wheel bolt head regardless of the temperature.

Figure 1:
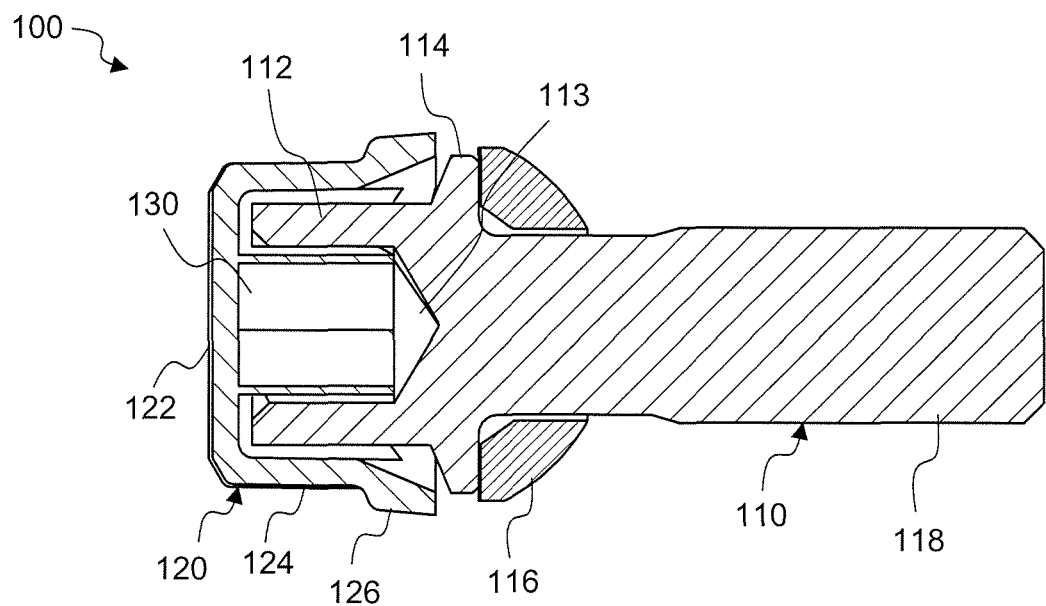
FIG. 1 illustrates a longitudinal cross-section of an example wheel bolt and wheel bolt cap in accordance with aspects of the present disclosure.

Turning to FIG. 1, a diagram 100 of a longitudinal cross-sectional view of an example wheel bolt 110 and wheel bolt cap 120 is illustrated. The wheel bolt cap 120 is shown in attached to the wheel bolt 110. As will be described in further detail below, the wheel bolt cap 120 may be press fit onto the wheel bolt 110. For example, the wheel bolt cap 120 may be attached to the wheel bolt 110 after the wheel bolt has been screwed into the vehicle hub to retain the wheel.

The wheel bolt 110 may include a bolt head 112, a flange 114, a washer 116, and a threaded shaft 118. The bolt head 112 may have a hexagonal outer surface matching a standard socket size, for example, 17 mm, 19 mm, 21 mm, 22 mm, ¼ inch, 13/16 inch, or ⅞ inch. The bolt head 112 may include a center cavity 113 defined by an inner surface of the bolt head 112. The center cavity 113 may reduce the total weight of the wheel bolt 110 compared to a wheel bolt having a solid bolt head. The center cavity 113 may include a generally cylindrical portion and a conical end portion. The bolt head 112 may also include a beveled edge along the inner surface.

The flange 114 may be formed between the threaded shaft 118 and the bolt head 112. The flange 114 may include a flat surface facing the washer 116 and the vehicle hub. The flange 114 may include a tapered external surface connecting to the external surface of the bolt head 112.

The washer 116 may be an annular disc or ring located between the flange 114 and the threaded shaft 118. The washer 116 may have a flat surface contacting the flange 114 and a curved or beveled surface that contacts the wheel, which may, for example, be an aluminum, alloy, or steel wheel. The washer 116 may distribute the load evenly along the wheel bore. The washer 116 may also help center the wheel bolt 110 within the wheel bore.

The threaded shaft 118 may match standard wheel bolt dimensions. For example, the threaded shaft 118 may have a diameter of 12 mm or 14 mm and a 1.5 mm right-hand thread.

The wheel bolt 110 may have strength and corrosion resistance properties. For example, the wheel bolt 110 may be formed of steel. The entire wheel bolt 110 may be coated with a zinc-aluminum composition film to prevent corrosion. In contrast to a chrome coating, the zinc-aluminum composition film may prevent corrosion without significantly decreasing strength. The film, however, may be unattractive compared to traditional chrome plating.

The wheel bolt cap 120 may be a plastic cap that covers the bolt head 112 when the wheel bolt 110 is installed in a vehicle hub to retain a wheel. The wheel bolt cap 120 may be formed of plastic material having desirable ornamental qualities. The wheel bolt cap 120 may also protect the wheel bolt 110 from road grime. Accordingly, the wheel bolt cap 120 may keep the wheel bolt 110 clean until a tool is used to engage the wheel bolt head 112 to remove the wheel bolt 110. The wheel bolt cap 120 may include an end wall 122, a side wall 124, a skirt 126, and a central member 130. The end wall 122, side wall 124, and skirt 126 may define the external surface of the wheel bolt cap 120. The central member 130 may be a retention feature that resides within the cavity 113 and may form a press fit with the internal surface of the bolt head 112.

The end wall 122 may be a flat hexagonal plate or a gently curved dish. The external surface of the end wall 122 may be smooth or may include an ornamental design. The internal surface of the end wall 122 may include bumpers (not shown) to stop longitudinal movement of the cap 120 onto the bolt head 112. For example, the bumpers may contact the edge of the bolt head 112.

The side wall 124 may be a generally cylindrical member extending longitudinally from the end wall 122. The external surface of the side wall 124 may be generally smooth. The side wall 124 may form an interference fit with the external surface of the bolt head 112. In an aspect described in further detail below, the side wall 124 may include a plurality of longitudinal ribs that contact the external surface of the bolt head 112.

The skirt 126 may be another generally cylindrical member extending from the side wall 124. The skirt 126 may have a greater diameter than the side wall 124. For example, the skirt 126 may have a diameter greater than or equal to the flange 114. The skirt 126 may have a curved or beveled external surface. The skirt 126 may have a beveled interior surface to help guide the placement of the cap 120 onto the bolt 110. In the exemplary embodiment, the skirt 126 adds rigidity (i.e., limits radial flex) to the side wall 124.

The central member 130 may extend longitudinally from the interior surface of the end wall 122. The central member 130 may be generally cylindrical. For example, the central member may have a cross-section that is circular, elliptical, or a regular polygon accounting for manufacturing tolerances. The central member 130 may have a diameter slightly less than the diameter of the cavity 113. The length of the central member 130 may be slightly less than the depth of the cylindrical portion of the cavity 113. The central member 130 may form an interference fit with the internal surface of the bolt head 112. As will be discussed in further detail below, the central member 130 may include a plurality of longitudinal ribs that contact the internal surface of the bolt head 112.

Figure 2:
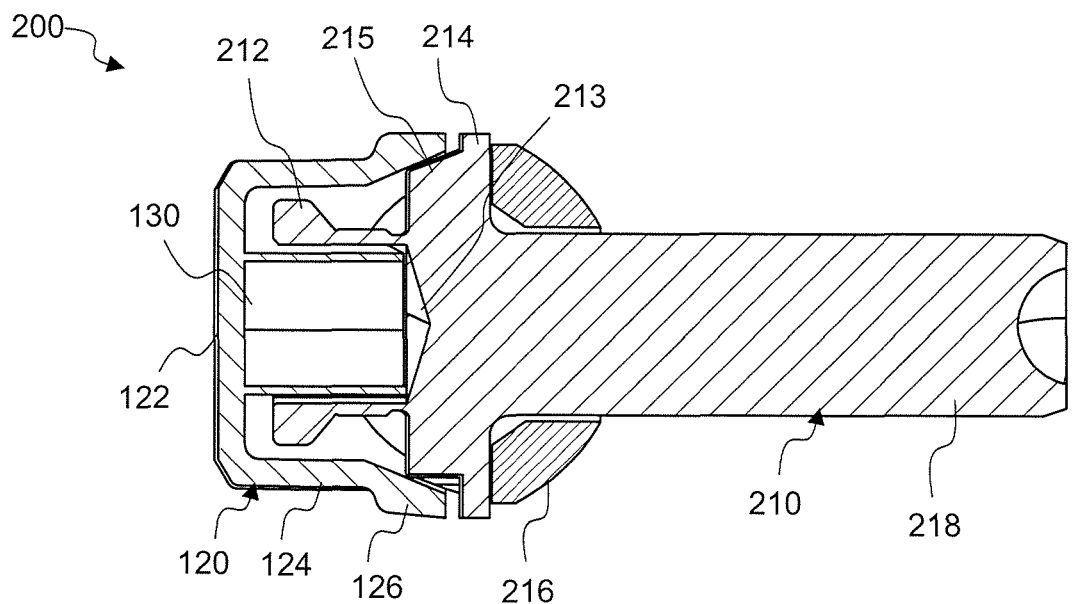
FIG. 2 illustrates a longitudinal cross-section of another example wheel bolt and wheel bolt cap in accordance with aspects of the present disclosure.

FIG. 2 illustrates a diagram 200 of a longitudinal cross-sectional view of another example wheel bolt 210 and the wheel bolt cap 120. The wheel bolt 210 may be a lock bolt. The wheel bolt cap 120 is shown attached to the wheel bolt 210. The wheel bolt cap 120 may be used with either the wheel bolt 110 or the wheel bolt 210.

Similar to the wheel bolt 110, the wheel bolt 210 may include a bolt head 212, a flange 214, a washer 216, and a threaded shaft 218. However, unlike bolt head 112, bolt head 212 does not have a standard hexagonal shape configured to fit within a standard sized socket. Rather, bolt head 212 may have a circular external surface that is not used to provide torque to the wheel bolt 210. Instead, the wheel bolt 210 may include a keyed portion 215. The keyed portion 215 may include a pattern of slots and/or teeth that correspond to slots and/or teeth of a speciality socket configured to fit that specific locking wheel bolt 210, or some subset of all similarly produced locking wheel bolts. The speciality socket may be placed over the bolt head 212 to engage the keyed portion 215. The bolt head 212 also includes a cavity 213 defined by an inner surface of the bolt head 112. The cavity 213 may reduce the total weight of the wheel bolt 210 compared to a wheel bolt having a solid bolt head. The cavity 213 may include a generally cylindrical portion and a conical end portion. The bolt head 212 may also include a beveled edge along the inner surface.

The flange 214 may be formed between the threaded shaft 218 and the bolt head 212. The flange 214 may include a flat surface facing the washer 216 and the vehicle hub. The flange 214 may include or be connected to the keyed portion 215. As illustrated, one side of the keyed portion 215 may include a tooth whereas an opposite side of the keyed portion 215 may include a slot, resulting in different radii along the cross-section.

The washer 216, the threaded shaft 218, and the wheel bolt 210 may have a similar configuration to the washer 116, the threaded shaft 118, and the wheel bolt 110, respectively described above.

The wheel bolt cap 120 may operate with the wheel bolt 210 in a similar manner as with the wheel bolt 110. The inner surface of the side wall 124 may form an interference fit with the external surface of the bolt head 212. For example, the outer diameter of the bolt head 212 may be the same as the distance between flat outer surfaces of the hexagonal bolt head 112. In an aspect, the length of the external surface of the bolt head 212 that contacts the side wall 124 may be shorter than the length of the external surface of the bolt head 112. The central member 130 may form an interference fit with the internal surface of the bolt head 212 in a similar manner as with the internal surface of the bolt head 112.

Figure 3:
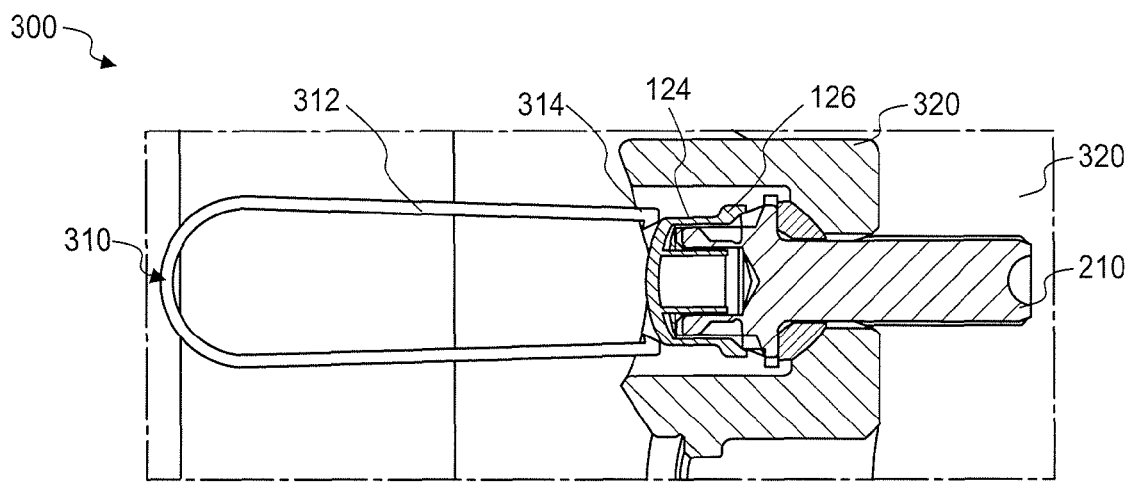
FIG. 3 illustrates an example tool for removing a wheel bolt cap in accordance with aspects of the present disclosure.
Figure 4:
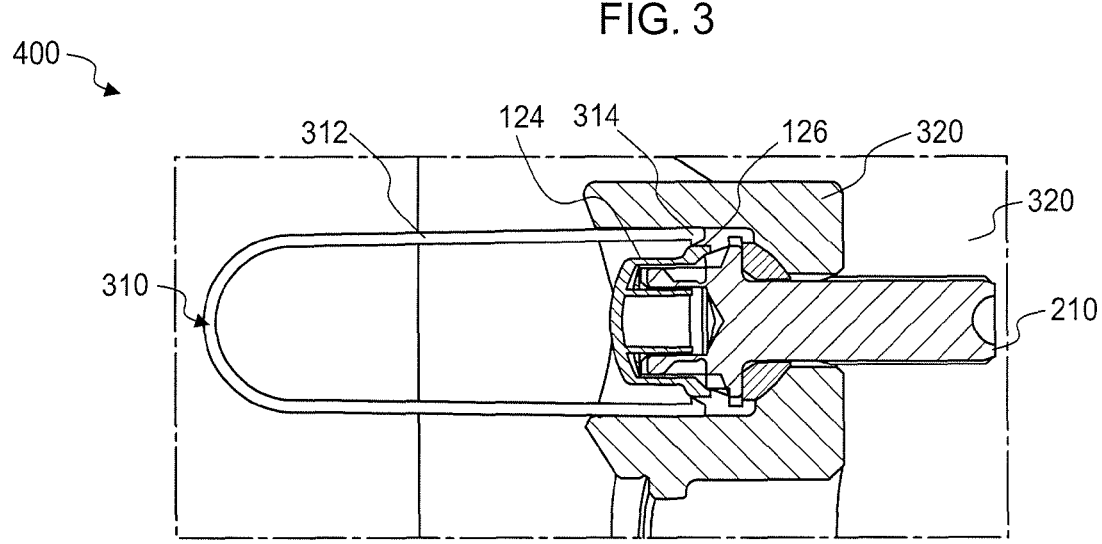
FIG. 4 illustrates an example tool for removing a wheel bolt cap in accordance with aspects of the present disclosure.
Figure 5:
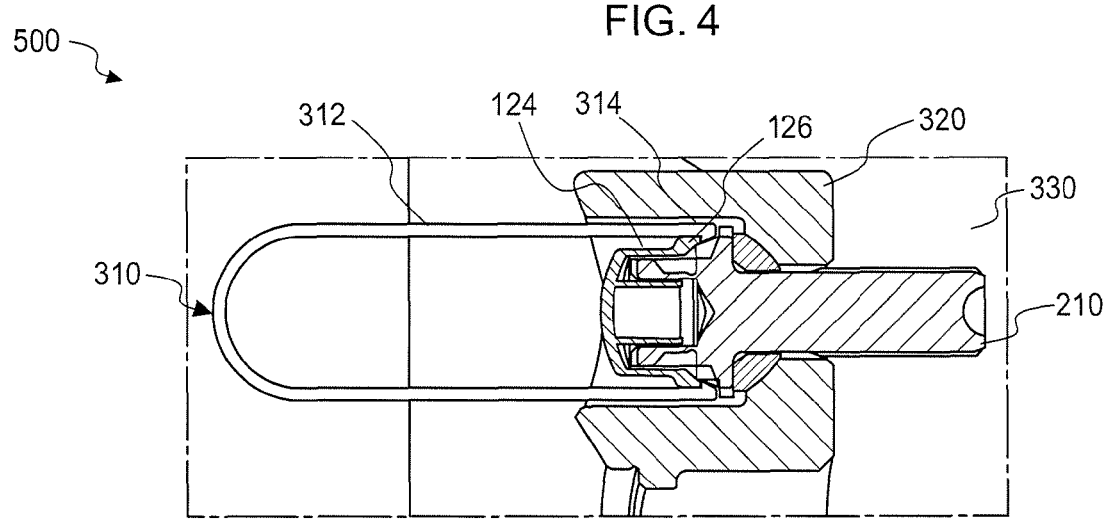
FIG. 5 illustrates an example tool for removing a wheel bolt cap in accordance with aspects of the present disclosure.

FIGS. 3-5 illustrate various stages of using an example tool 310 for removing the wheel bolt cap 120. The tool 310 may be a tong-like device having two interconnected arms 312 having a toothed end 314. The toothed end 314 may include an internal ramp surface and an internal shoulder. The wheel bolt 210 is shown inserted through a wheel 320 into the hub 330.

At stage 300 shown in FIG. 3, the tool 310 may be placed such that the toothed ends 314 contact the end wall 122 of the cap 120. The ramp surface may ride along the end wall 122 and may cause the arms 312 to spread. As the tool is moved toward the wheel 320, the ramp surface may continue to ride along the side walls 124 and skirt 126 causing the arms 312 to spread farther. At stage 400 shown in FIG. 4, the toothed ends 314 are located outside of the skirt 126. At stage 500 shown in FIG. 5, the toothed ends 314 may have moved past the skirt 126 and into a gap between the skirt 126 and the flange 214. The shoulder of the toothed end 314 may contact the edge of the skirt 126. The elastic force of the tool 310 may maintain the contact between the toothed end 314 and the skirt 126, but additional force may be applied by squeezing the arms 312. The cap 120 may be removed by pulling the tool 310 proximally to the left in the illustrated example. The cap 120 may be removed without rotating the tool 310. In an aspect, the tool 310 may be free to rotate along a curved external surface of the skirt 126.

Figure 6:
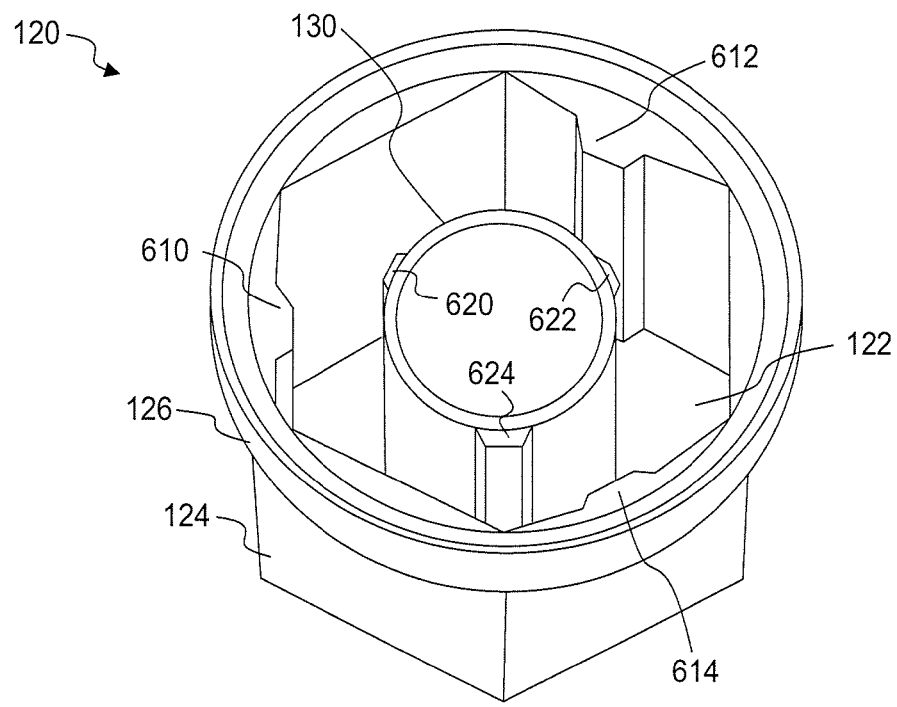
FIG. 6 illustrates a bottom perspective view of an example wheel bolt cap in accordance with aspects of the present disclosure.
Figure 7:
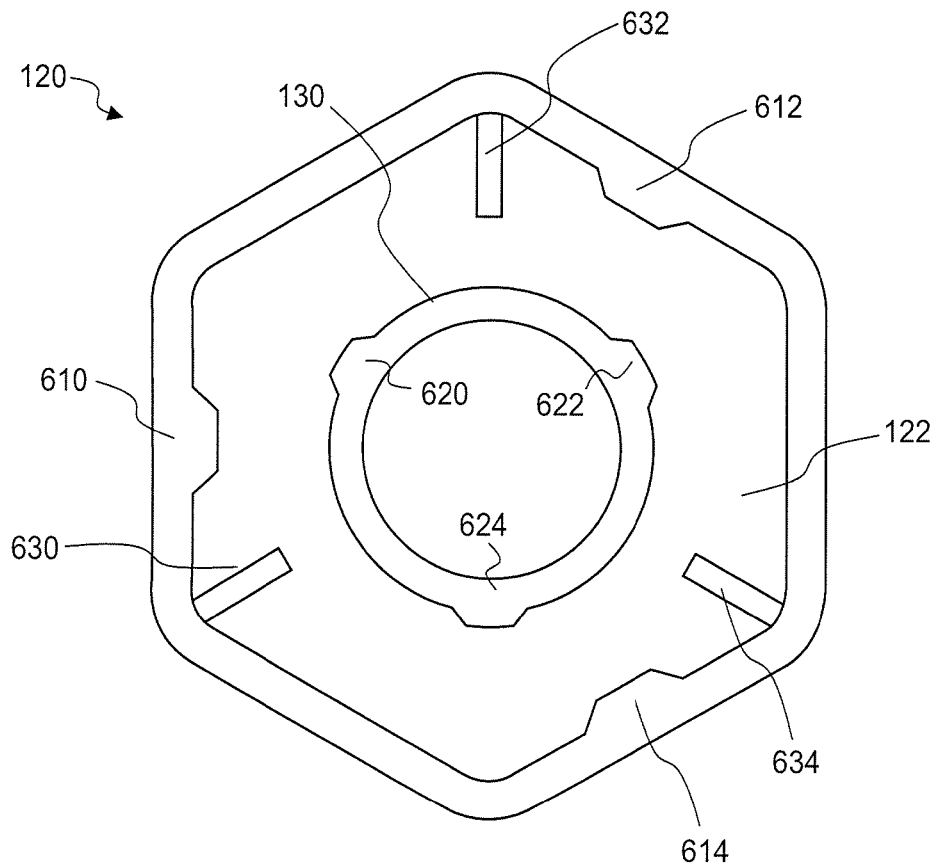
FIG. 7 illustrates a transverse cross-section of an example wheel bolt cap in accordance with aspects of the present disclosure.

FIG. 6 illustrates a bottom perspective view of the cap 120. FIG. 7 illustrates a cross-sectional view of the cap 120 transverse to the longitudinal axis. As illustrated, the side wall 124 may include a plurality of ribs 610, 612, 614 that may extend longitudinally. The ribs 610, 612, 614 may have a beveled edge extending from the beveled edge of the side wall 124. The ribs 610, 612, 614 may also include beveled sides. The ribs 610, 612, 614 may be located at the center of a flat portion of the side wall 124. Accordingly, the ribs 610 may contact a flat surface of the hexagonal bolt head 112 or any point on the outer surface of the circular bolt head 212. As illustrated, the plurality of ribs may include three ribs. It should be appreciated that the number of ribs may be varied to provide a desired level of interference, which may increase or decrease the force required to insert or remove the cap 120.

The cylindrical member 130 may also include a plurality of ribs 620, 622, 624. Each of the ribs 620, 622, 624 may include a beveled leading edge that may help align the cylindrical member 130 with the cavity 113 or the cavity 213. The ribs 620, 622, 624 may also include beveled sides. The ribs 620, 622, 624 may be evenly spaced around the circumference of the cylindrical member 130. As illustrated, the plurality of ribs includes three ribs 620, 622, 624. In an aspect, the ribs 620, 622, 624 are offset from the ribs 610, 612, 614. In an aspect, for example, the offset may be approximately 30 degrees as measured by an angle between two lines extending from the center of the cap 120 and passing through corresponding ribs such as rib 610 and rib 620. The offset between the ribs may reduce dependency between the interference caused by the external ribs 610, 612, 614 and the internal ribs 620, 622, 624. For example, both the side wall 124 and the cylindrical member 130 may act as a hoop spring allowing distribution of stress. In contrast, if the ribs are aligned opposite each other, the opposing ribs may mutually increase interference with the bolt head sandwiched between the ribs.

As illustrated in FIG. 7, the end wall 122 may include bumpers 630, 632, 634. The bumpers 630, 632, 634 may limit longitudinal movement of the cap 120 onto the wheel bolt 110 or the wheel bolt 210. As the cap 120 is pressed onto the wheel bolt 110 or the wheel bolt 210, the bumpers 630, 632, 634 may contact the edge of the bolt head 112 or bolt head 212. The bumpers 630, 632, 634 may prevent the skirt 126 from contacting the flange 114 or flange 214. The bumpers 630, 632, 634 may also limit the total interference between the ribs 610, 612, 614, 620, 622, 624 and the bolt head 112 or bolt head 212 by limiting the longitudinal surface of the ribs allowed to contact the bolt head 112 or bolt head 212. For example, the bumpers 630, 632, 634 control the depth to which the bolt head extends into the cap 120. Since the side walls 124 of the cap 120 are stiffer (i.e., allows less radial flex) near end wall 122 than in a middle of the side walls 124, controlling the depth to which the bolt head extends into the cap 120 facilitates controlling the stress on the ribs 610, 612, 614, 620, 622, 624 and side walls 124.

In an aspect, the wheel bolt cap 120 may be formed by molding. For example, known injection molding techniques may be used. Alternatively, any other plastic forming techniques may be used. The wheel bolt cap 120 may be removed from the injection mold in a finished state. The wheel bolt cap 120 may also undergo finishing procedures such as painting, coating, or polishing.

The plastic of the wheel bolt cap 120 may have a higher thermal expansion coefficient than the steel of the wheel bolt 110 or wheel bolt 210. Accordingly, as the temperature increases the wheel bolt cap 120 may increase in size relative to the wheel bolt 110, 210. As the wheel bolt cap 120 increases in size, the external ribs 610, 612, 614 may provide less interference with the external surface of the bolt head 112, 212. The internal ribs 620, 622, 624, however, may provide greater interference with the internal surface of the bolt head 112, 212. Conversely, as the temperature decreases, the wheel bolt cap 120 may decrease in size relative to the wheel bolt 110, 210. As the wheel bolt cap 120 decreases in size, the internal ribs 620, 622, 624, may provide less interference with the internal surface of the bolt head 112, 212. the external ribs 610, 612, 614, however, may provide greater interference with the external surface of the bolt head 112, 212. Accordingly, the combination of internal and external interference may reduce fluctuation in the total interference holding the cap 120 to the bolt head 112, 212.

Figure 8:
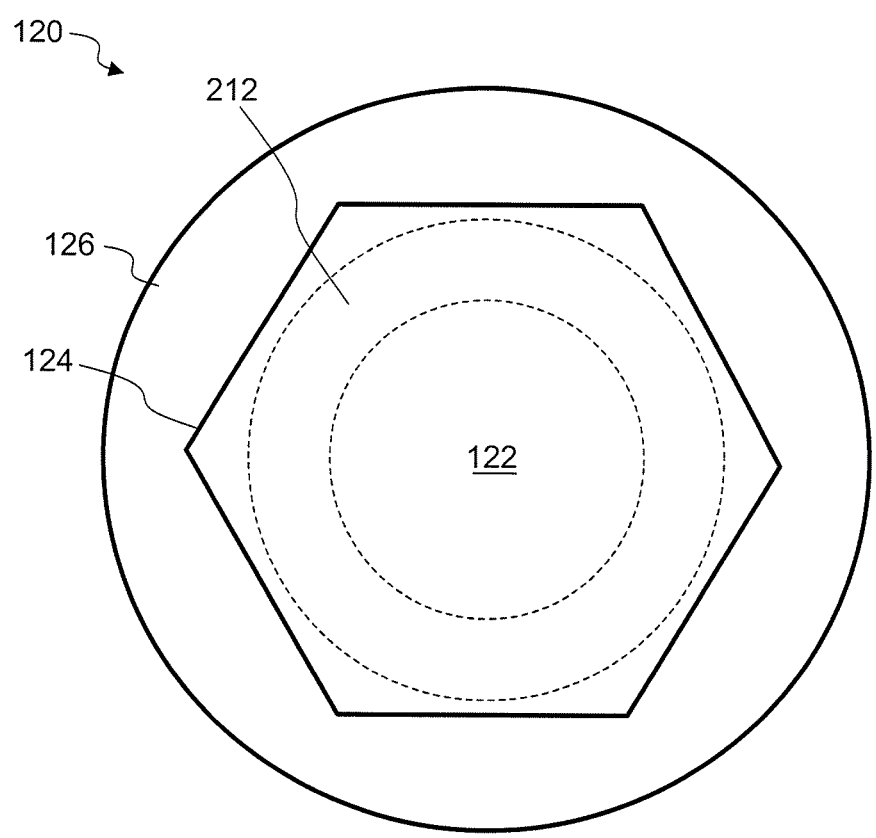
FIG. 8 illustrates an top plan view of an example wheel bolt cap in accordance with aspects of the present disclosure.

FIG. 8 illustrates a top plan view of the exterior of the wheel bolt cap 120. As illustrated, the skirt 126 may be circular and the end wall 122 may be hexagonal. The side wall 124 may be the outer surface of a hexagonal prism corresponding to the end wall 122. The location of the bolt head 212 is shown in dashed lines for reference. It should be appreciated that the shape of the external surfaces may be varied, for example, for ornamental purposes. Also, it should be appreciated that any corners may be rounded.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A decorative cap and fastener for fastening a wheel to a hub of a vehicle, comprising:

a fastener head comprising an outer surface and an internal surface defining a cylindrical cavity; and a cap comprising:

an end wall having an external surface and an internal surface;

a side wall extending from an outer periphery of the end wall;

a central member extending longitudinally from the internal surface of the end wall within the side wall; and a plurality of bumpers extending from the internal surface of the end wall, the plurality of bumpers configured to control a level of stress on the side walls.

2. The decorative cap and fastener of claim 1, wherein the central member fits within the cavity and forms an interference fit with the internal surface of the fastener head.

3. The decorative cap and fastener of claim 1, wherein the central member is generally cylindrical and includes a first plurality of ribs extending longitudinally along an external surface of the central member.

4. The decorative cap and fastener of claim 3, wherein the first plurality of ribs contact the internal surface of the fastener head.

5. The decorative cap and fastener of claim 4, wherein the side wall includes a second plurality of ribs extending longitudinally along an internal surface of the side wall.

6. The decorative cap and fastener of claim 5, wherein the second plurality of ribs form an interference fit with the external surface of the fastener head.

7. The decorative cap and fastener of claim 5, wherein the side wall includes six sides and each of the plurality of ribs is located at a center of one of the sides.

8. The decorative cap and fastener of claim 5, wherein the first plurality of ribs is offset from the second plurality of ribs.

9. The decorative cap and fastener of claim 1, wherein the cap further comprises a skirt extending from an end of the side wall, the skirt having a larger diameter than the side wall.

10. The decorative cap and fastener of claim 1, wherein the cap comprises a first material having a higher thermal expansion coefficient than a thermal expansion coefficient of a second material of the fastener head.

11. The decorative cap and fastener of claim 1, wherein the outer surface of the fastener head is one of a hexagon or a circle.

12. The decorative cap and fastener of claim 1, wherein the cap is configured to fit on a fastener having a hexagonal head and configured to fit on a locking fastener having a circular head.

* * * * *